(12) United States Patent
Lerch et al.

(10) Patent No.: US 6,561,694 B1
(45) Date of Patent: May 13, 2003

(54) METHOD AND DEVICE FOR CALIBRATING MEASUREMENTS OF TEMPERATURES INDEPENDENT OF EMISSIVITY

(75) Inventors: Wilfried Lerch, Dornstadt (DE); Markus Hauf, Ichenhausen (DE)

(73) Assignee: STEAG RTP Systems GmbH (DE)

( * ) Notice: Subject to any disclaimer, the term of this patent is extended or adjusted under 35 U.S.C. 154(b) by 0 days.

(21) Appl. No.: 09/744,880

(22) PCT Filed: Jul. 28, 1999

(86) PCT No.: PCT/EP99/05396

§ 371 (c)(1),
(2), (4) Date: Apr. 19, 2001

(87) PCT Pub. No.: WO00/06981

PCT Pub. Date: Feb. 10, 2000

(30) Foreign Application Priority Data

Jul. 28, 1998 (DE) ............................ 198 33 961
Jul. 21, 1999 (DE) ............................ 199 34 299

(51) Int. Cl.[7] ................................................ G01J 5/00
(52) U.S. Cl. .................... 374/126; 374/132; 374/1; 374/129
(58) Field of Search .............................. 374/1, 121, 126, 374/2, 129, 130

(56) References Cited

U.S. PATENT DOCUMENTS

| 3,077,539 | A |   | 2/1963  | Blau, Jr. et al.          |
|-----------|---|---|---------|---------------------------|
| 4,169,032 | A | * | 9/1979  | Haase et al. ..... 204/192 F |
| 4,984,902 | A | * | 1/1991  | Crowley et al. ..... 374/1 |
| 5,154,512 | A | * | 10/1992 | Schietinger et al. ..... 374/9 |
| 5,156,461 | A | * | 10/1992 | Moslehi et al. ..... 374/121 |
| 5,226,732 | A | * | 7/1993  | Nakos et al. ..... 374/133 |
| 5,265,957 | A |   | 11/1993 | Moslehi et al.            |
| 5,305,416 | A | * | 4/1994  | Fiory ..... 392/416        |
| 5,326,170 | A |   | 7/1994  | Moslehi et al.            |
| 5,467,732 | A | * | 11/1995 | Donnelly, Jr. et al. ..... 117/86 |
| 5,490,728 | A |   | 2/1996  | Schietinger et al.         |
| 5,553,939 | A |   | 9/1996  | Dilhac et al.             |
| 5,601,366 | A | * | 2/1997  | Paranjpe ..... 374/126     |
| 5,624,590 | A |   | 4/1997  | Fiory                     |
| 5,815,396 | A | * | 9/1998  | Shimamura et al. ..... 364/469.02 |
| 5,823,681 | A | * | 10/1998 | Cabib et al. ..... 374/126 |
| 5,848,842 | A | * | 12/1998 | Peuse et al. ..... 374/1   |
| 5,938,335 | A | * | 8/1999  | Yam ..... 374/124          |
| 5,993,059 | A | * | 11/1999 | O'Neill et al. ..... 374/126 |
| 6,048,403 | A | * | 4/2000  | Deaton et al. ..... 118/725 |
| 6,056,434 | A | * | 5/2000  | Champetier ..... 374/126   |
| 6,183,127 | B1 | * | 2/2001  | Hebb et al. ..... 374/9   |
| 6,200,023 | B1 | * | 3/2001  | Tay et al. ..... 374/161  |
| 6,200,634 | B1 | * | 3/2001  | Johnsgard et al. ..... 427/248.1 |
| 6,283,630 | B1 | * | 9/2001  | Yazawa ..... 374/128      |
| 6,284,048 | B1 | * | 9/2001  | Van Bilsen et al. ..... 118/666 |
| 6,293,696 | B1 | * | 9/2001  | Guardado ..... 374/2      |

FOREIGN PATENT DOCUMENTS

| DE | 197 37 802.1 |   | 8/1997  |             |
|----|--------------|---|---------|-------------|
| DE | 197 54 386.3 |   | 12/1997 |             |
| EP | 0 539 984 A2 |   | 10/1992 |             |
| EP | 0 539 984    |   | 5/1993  |             |
| JP | 565347       | * | 1/1981  | ..... C03C/3/30 |
| JP | 9114878      | * | 7/1994  |             |
| WO | WO 94/00744  |   | 1/1994  |             |

* cited by examiner

*Primary Examiner*—Christopher W. Fulton
*Assistant Examiner*—Gail Verbitsky
(74) *Attorney, Agent, or Firm*—R W Becker & Associates; R W Becker (57) ABSTRACT

A method and apparatus for calibrating temperature measurements that are taken with a first radiation detector for measuring thermal radiation given off by a reference substrate are provided. The method includes the steps of heating the reference substrate, which carries at least one reference material having a known melting point temperature, to or over the melting point temperature and measuring the thermal radiation of the reference substrate during the heating step, during a cooling period that follows the heating, or during both the heating and the cooling periods. The method also includes the step of correlating a measurement plateau of the thermal radiation which occurs during the measuring step with the known melting point temperature.

29 Claims, 4 Drawing Sheets

METHOD AND DEVICE FOR CALIBRATING MEASUREMENTS OF TEMPERATURES INDEPENDENT OF EMISSIVITY

BACKGROUND OF THE INVENTION

The present invention relates to a method and apparatus for calibrating temperature measurements that are taken with at least one first radiation detector for measuring heat radiation emitted by at least one substrate.

Methods and apparatus of this type are known, for example, in connection with the production of semiconductor substrates in a reaction chamber. Preferred in such chambers are methods that are independent of emissivity and in which heat radiation coming from a first substrate is compared to the actual temperature of the substrate largely independent of the current emissivity. Such a method compensates differences in emissivity between different substrates. Used for achieving a measurement method that is independent of emissivity are, for example, the so-called "ripple technique", which is described, for example in U.S. Pat. No. 5,490,728 and in DE 197 54 386 A (not previously published) from the same applicant, and the cavity principle, in which, for example, a mirrored chamber is closed on one side by an article to be measured, whereby an approximation of a cavity radiator with emissivity 1 is achieved. Another method that uses the cavity principle is described, for example, in DE 197 37 802 (not previously published) from the same applicant, which is incorporated into this application in order to avoid repetition. In the known methods wafers are used and a thermoelement (TC—ThermoCouple) is glued to the tops or bottoms thereof. Experience has demonstrated that the measurement deviation from TC to TC is very small as long as the TCs were produced from pairs of wires in the same series. The deviation then ranges from about 1 to 2° K. Based on this slight deviation, the temperature measurements can be adjusted to be independent of emissivity since in this case the issue in particular is slight deviation between the TCs. The uncertainty in the measurement of the absolute temperature is substantially greater, however, whereby the measurement uncertainty is at best in the region of 2–3 K and is more than 10 K–20 K in less favorable cases.

These measurement uncertainties are the result of different factors. Among these factors is that the thermoelectromotive force of the thermopair depends not only on the temperature but also on the alloy, but it is subject to certain deviation determined by production factors. Furthermore, provided between the TC and its amplifier are a plurality of electrical connections that also constitute the thermopair, so that unsymmetrical transitions produce additional thermoelectromotive force. In addition, the adhesive sites for the TCs have a different degree of absorption than the wafer surface surrounding the adhesive sites. The equilibrium temperature of the TCs is thus not determined solely by means of heat conducted between wafer and TC, which would be ideal, but rather the temperature of the TC is also influenced by the heat radiated from the lamp, which is why the temperature of the TCs frequently does not precisely equal the temperature of the substrate.

The measurement uncertainties thus arise primarily from erroneous sources that affect all TCs in the same manner as measurement errors. TCs are therefore measurement recorders that have great absolute measurement uncertainty, although they have a low deviation.

For achieving improved measurement accuracy, the TCs were calibrated in a TC calibrator, i.e., in an oven with very homogenous temperature distribution in the interior in terms of absolute temperature measurement. A plurality of uncalibrated TCs were placed in the oven together with a reference TC, whereby the reference TC itself was calibrated by a separate calibration service using a transfer pyrometer with respect to a primary reference. These multiple calibrations require different apparatus, they are very expensive, and, due to the many steps involved, there are numerous opportunities for errors to be introduced into the calibration process, which could again result in measurement uncertainties at the end of the process.

Figure 6:
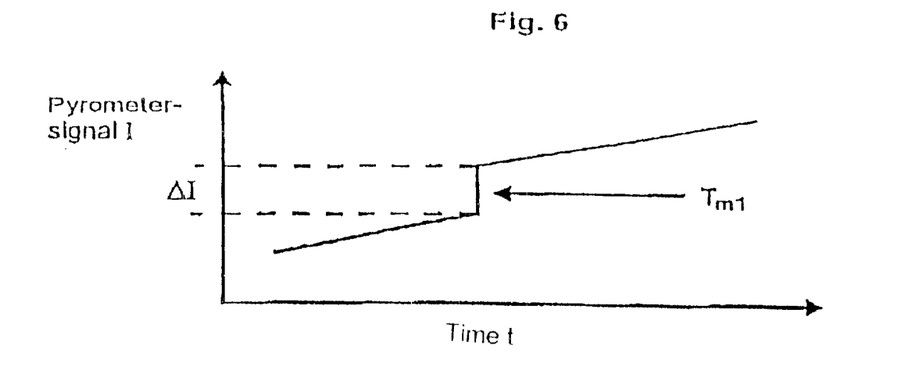
FIG. 6 is a temperature/time curve for a reference substrate for the prior art.

Furthermore, known from U.S. Pat. No. 5,265,957 is an apparatus and a method for calibrating a temperature sensor in which a wafer is provided with a plurality of calibration islands made of a reference material with a melting point in the range of 150° C. to 550° C. While such a wafer is being heated, the effective reflectivity of the wafer is measured by the temperature sensor and a first step change in an output signal of the temperature sensor is equated to a wafer temperature that equals the melting point of the reference material. Then temperature sensor calibration parameters are calculated. This principle is illustrated in FIG. 6. The signal I of a temperature sensor (pyrometer) is recorded as a function of time t while the wafer is heated. For the reflectivity of the wafer to change when the reference material reaches phase transition, the reference material must be arranged close to the surface so that it is in the range of the penetration depth of the measurement wavelength. The aforementioned step change in the pyrometer signal occurs at the phase transition of the reference material, as shown in FIG. 6. The method shown in U.S. Pat. No. 5,265,957 has substantial disadvantages. For instance, no unique pyrometer value can be allocated to melting point $T_{m1}$ due to the step change in the pyrometer signal, which results in a systematic measurement error $\Delta I$ for the calibration method.

The object of the invention is therefore to provide a method and an apparatus of the type cited in the foregoing in which temperature measurements can be calibrated with great accuracy in a simple and cost-effective manner.

SUMMARY OF THE INVENTION

This object is inventively achieved using a method of the type described in the foregoing that has the following process steps: heating a reference substrate carrying at least one reference material with a known melting point to the melting point or over the melting point; measuring the thermal radiation of the reference substrate during the heating and/or during a cooling period following the heating; comparing a measurement plateau during the measurement process to the known melting point.

Heating the reference material located on the reference substrate raises the temperature of the reference substrate and the reference material until it reaches the melting point of the reference material. Once the melting point has been achieved, the temperature does not increase further until all of the reference material has converted to the liquid phase, that is, until the latent heat has been conveyed to the reference material. During cooling, this process reverses in a known manner. Since the melting point of the reference material is known precisely, it is possible to compare a measurement plateau measured during the heating and/or during a cooling period following the heating to the known melting point, thus achieving simple calibration of an absolute temperature measurement.

Advantageously the measurement plateau is determined during the heating and/or cooling of the reference substrate.

However, the measurement plateau is preferably determined during the cooling period since the reference material in its melted state prior to complete solidification has particularly good contact to the reference substrate in terms of heat conductivity.

The method in accordance with the invention has substantial advantages compared to the method in U.S. Pat. No. 5,265,957 described in the foregoing. Since the method does not depend on changes in the emissivity of the reference substrate, it is possible to surround the reference material with a thick protective coating or to arrange the reference material in the interior of the reference substrate. It is not necessary to arrange it near the surface. The advantage of this is that the reference material cannot contaminate the processing chamber. This is the basic prerequisite for broad use of the reference substrate in semiconductor technology.

Figure 7:
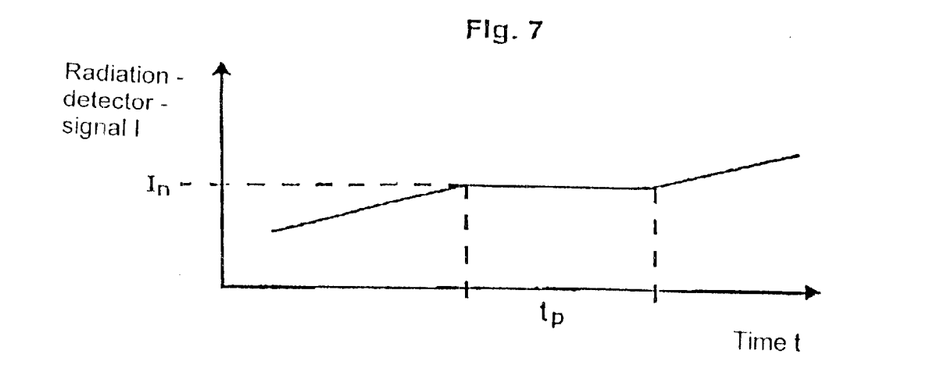
FIG. 7 is a temperature/time curve for the reference substrate in accordance with the invention.

An additional advantage results from the occurrence of a measurement plateau at the known melting point, as illustrated in FIG. 7. In contrast to the method described in U.S. Pat. No. 5,265,957, in the method in accordance with the invention, due to the plateau, it is possible to clearly allocate a radiation detector signal to a melting point. The system error ΔI mentioned in the foregoing is minimized in the method in accordance with the invention.

Formation of a plateau furthermore has the advantage that during the time $t_p$, thermal equilibrium occurs between the reference material and the reference substrate, thereby minimizing possible temperature differences. It is furthermore advantageous that optical properties of the surface of the reference substrate do not change during the method in accordance with the invention. For instance, if the reference substrate (with the exception of a reference material located in the interior) is selected from the same material as the substrate to be processed later (e.g. Si), the reference substrate has the same emissivity as this substrate. This means that the radiation detector can be calibrated directly while substrates are being processed, even without compensating for emissivity. It is only when the substrates have a different (spectral) emissivity, e.g. due to different surface quality, that a correction has to be undertaken or the emissivity has to be compensated. If it is possible to process the substrate without emissivity compensation, this has the further advantage that only one radiation detector is required for the temperature measurement. Such a temperature measurement method with only one radiation detector is not possible with the method described in U.S. Pat. No. 5,265,957 because in this method the emissivity of the surface of the reference substrate changes when the phase changes.

In order for the plateau to be easily detectable in terms of metrology, the mass of the reference material should be at least 1% of the total mass of the reference substrate. This low mass ratio can be selected because the specific melting heat is a multiple of the specific heat capacity. In order for the optical properties of the surface of the reference substrate not to change, the protective coating of the reference material is preferably selected to be at least equal to three times the optical attenuation length that the protective coating has for the measurement wavelength of the radiation detector.

In order to achieve a temperature measurement that is independent of emissivity, in accordance with a particularly preferred embodiment of the invention the reference substance is heated with at least one radiant heat source whose emitted radiation is modulated, advantageously actively modulated, with at least one characteristic parameter, whereby the radiation emitted from the at least one radiant heat source is detected with at least one second radiation detector, and whereby the radiation detected by the first radiation detector is corrected by the radiation detected from the second radiation detector to compensate the radiation of the radiation source that is reflected by the reference substrate.

Because of the characteristic known modulation of the radiation source, it is possible to differentiate between the radiation emitted by the article itself, which is necessary for determining the temperature of the reference substrate, and the reflected radiation of the radiation source. For additional advantages and details with respect to the modulation and evaluation of the radiation of the radiation source, known as the "ripple" technique, refer to U.S. Pat. No. 5,490,728 and to DE 197 54 386 A (not previously published) from the same applicant, the contents of which are incorporated into the instant specification.

In this manner it is possible to achieve calibration of the absolute temperature independent of knowing the emissivity of the reference substrate. In order to adjust the measurement system to be independent with respect to emissivity, TC wafers can be used to precalibrate, since in this case the issue is primarily minor deviation between the TCs.

Advantageously, the modulation is used to characterize the radiation emitted from the radiation source when the radiation detected by the first radiation detector is being corrected, which makes it possible to differentiate very simply, reliably, and precisely the radiation from the radiation that is actually to be measured and that is emitted by the reference substrate itself.

The radiation emitted from the radiation source is preferably amplitude, frequency, and/or phase-modulated. Depending on the specific qualities and requirements, the type of modulation is selectable, whereby the type of modulation is selectable in particular with respect to the simplicity and reliability of the modulation method, but also with regard to evaluation and detection methods.

In accordance with a preferred embodiment of the invention, the radiant heat source comprises a plurality of lamps, whereby at least the radiation from one of the lamps is modulated, but advantageously the radiation of all of the lamps is modulated.

Advantageously the degree of modulation or the depth of modulation is controlled, whereby this degree of modulation or depth of modulation is known, and the detection and evaluation are simplified.

The temperature measurement independent of emissivity can advantageously also be achieved in that the measurement of the heat radiation emitted by the substrate is taken on a side of the substrate that constitutes at least a part of a cavity radiator.

In accordance with another preferred embodiment of the invention, a plurality of reference materials, each with a different melting point, are provided on the reference substrate, and the measurement plateaus are determined during the heating and/or cooling period, and they are each compared to one of the known melting points.

The instant invention can be used to great advantage for calibrating a temperature measurement in conjunction with an apparatus for thermal treatment of substrates in an oven in which the substrates are heated and cooled rapidly and with the most accurate possible pre-specified temperatures.

The aforestated object is also achieved in accordance with the invention using an apparatus for calibrating temperature measurements of the type cited in the foregoing that has the following: a reference material with known melting point that is applied to a reference substrate, a source of radiation for heating the reference substrate, whose emitted radiation can be modulated, preferably actively, by means of a modulation device with at least one characteristic parameter, and at least one second radiation detector for measuring the radiation emitted by the at least one source of radiation, and a device for correcting the radiation detected by the first radiation detector, for compensating the radiation of the source of radiation reflected by the reference substrate by means of the radiation detected by the second radiation detector.

The use of a reference substrate with a reference material applied thereto that has a known melting point in combination with the active modulation results in the aforementioned advantages of simple calibration of a temperature measurement independent of emissivity.

In accordance with one embodiment of the invention, the apparatus has a cavity radiator that is formed at least partially by the substrate.

The cavity radiator is preferably formed by a mirrored chamber whose one wall is formed at least in part by the substrate. Advantageously the cavity radiator can also be formed by a plate that is arranged parallel to the substrate.

In accordance with a preferred exemplary embodiment, provided on the reference substrate is a covering that provides a chamber for receiving the reference material between itself and the reference substrate. Preferably the chamber is sealed against its surroundings in order to prevent the reference material from contaminating the apparatus to be calibrated. In order to provide uniform pressure (partial pressure of the reference material) in the chamber, it is advantageously evacuated, which is also associated with the advantage that no liquid reference material is pressed out through any extant microtears under the pressure of heated residual gas. The entire reference substrate is advantageously glazed.

Advantageously the reference substrate has at least one depression for receiving the at least one reference material, whereby the bottom of the reference substrate in the region of the reference material is as thin as possible in order to keep as small as possible a temperature difference between the underside of the reference substrate and the reference material. A plurality of depressions is preferred for reasons of stability. The walls of the depressions are preferably inclined in order to avoid mechanical tensions due to different coefficients of expansion between the reference substrate and the reference material.

Advantageously the reference substrate has the same size and/or shape and/or the same weight as the substrate whose temperature is to be measured after the calibration in order to manage the reference substrate with an available handling system for the substrate to be measured. In this manner calibration or re-calibration can be automated. The advantage over conventional TC substrates is not only the increase in accuracy and reproducibility, but also that a TC substrate cannot be handled automatically due to the connection wires and the wires must be clamped on after the TC substrate has been inserted. This situation does not occur with the described reference substrate.

Advantageously the at least one reference material is a metal, since the melting points for metals, especially very pure metals, are known or defined very precisely.

In accordance with another embodiment of the invention, the different reference materials are provided with different melting points on the reference substrate in order to facilitate calibration at different temperatures.

Advantageously at least one reference material is arranged at different sites on the reference substrate, thus making it possible to ensure that the reference material covers the field of view of the first radiation detector.

Advantageously the reference substrate carries the at least one reference material on a side facing away from the radiation detector. In order to achieve high emissivity in the reference substrate, structures, such as microchannels, are advantageously provided on a side of the reference substrate that faces the radiation detector.

A plurality of reference substrates with different optical coatings are provided in order to obtain primary references with different emissivities. By providing primary references with different emissivities, it is possible to dispense completely with complex precalibration using TC wafers.

Due to the relatively simple manufacture and thermal properties of ceramic material, the reference wafer is preferably made thereof.

The instant invention is highly suitable for calibrating an apparatus for rapid thermal treatment of substrates in an oven in which the substrates are rapidly heated and cooled at the most precise possible pre-specified temperatures.

BRIEF DESCRIPTION OF THE DRAWINGS

The invention is described in more detail in the following in the context of the example of an apparatus for heating semiconductor wafers and referring to the figures, in which:

FIG. 2 is a cross-section along the line II—II in FIG. 1;

FIG. 2$a$ is a schematic side elevational view of an alternative rapid heating assembly for the treatment of semi-conductor wafers;

FIG. 2$b$ is a schematic side elevational view of an alternative rapid heating assembly for the treatment of semi-conductor wafers;

DESCRIPTION OF PREFERRED EMBODIMENTS

Figure 1:
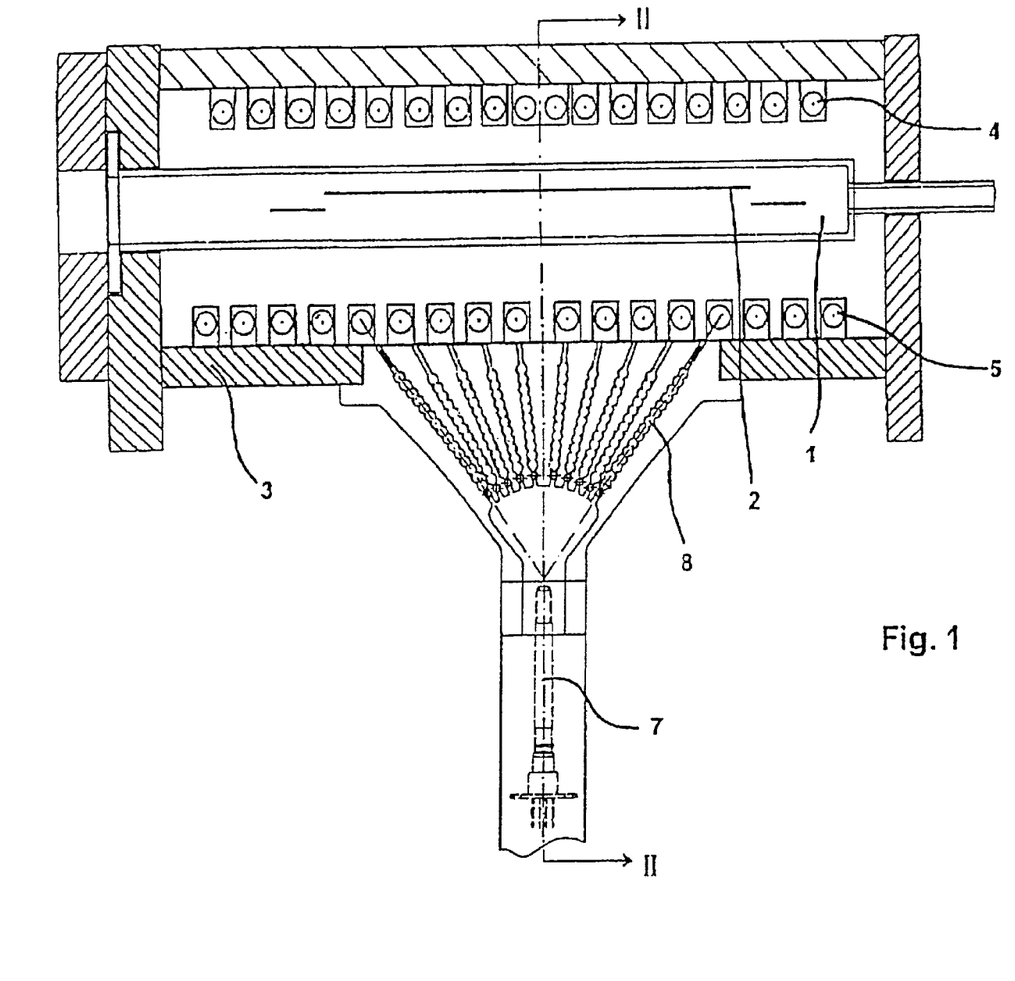
FIG. 1 schematically illustrates a longitudinal section through a rapid heating system for treating semiconductor wafers.

The embodiment of a rapid heating oven for treating semiconductor wafers 2, illustrated in FIGS. 1 and 2, has a reaction chamber 1, preferably comprising silica glass, with semiconductor wafers 2 disposed therein. The reaction chamber 1 is surrounded by a housing 3 that has lamps 4, 5 above and below, the radiation of which is directed onto the reaction chamber 1. A schematically illustrated pyrometer 6 (see in particular FIG. 2) with a large intake angle measures the radiation emitted by the semiconductor wafer 2 and the radiation from the lamps 5 reflected on the semiconductor 2, the lamps constituting bar lamps in the exemplary embodiment illustrated. An arrangement of this type is described, for example, in DE 197 37 802 A (not previously published) or DE 197 54 386 A (not previously published) from the same applicant; to avoid repetition, see these documents, which are incorporated into the instant specification.

Figure 2A:
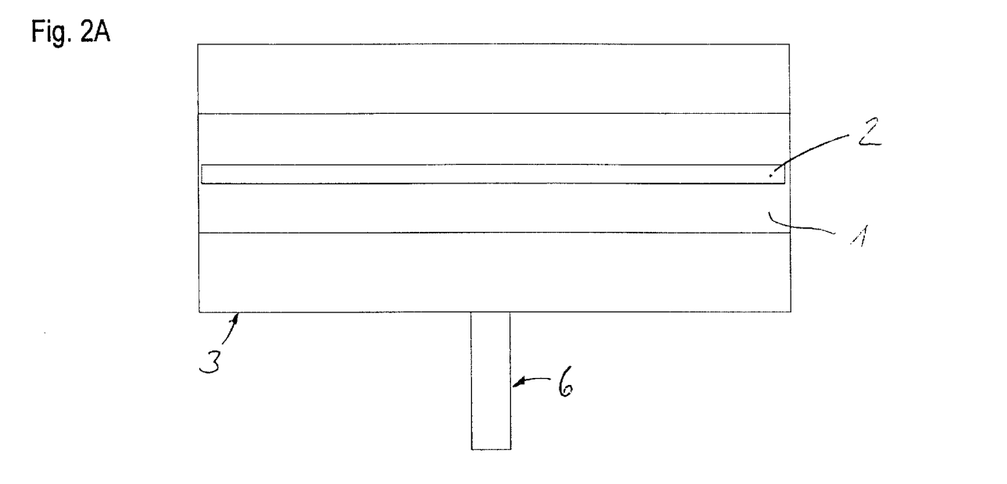

FIG. 2a shows a side elevational view of an alternative rapid heating assembly for the treatment of semi-conductor wafers, wherein the assembly includes a reaction chamber 1, comprised of quartz glass, which is enclosed within a housing 3 having reflective interior walls. A semi-conductor wafer 2 is received within the reaction chamber 1 with the outer dimensions of the semi-conductor wafer being somewhat smaller than the interior dimensions of the reaction chamber. A pyrometer 6 is provided on the housing 3 and is oriented toward a side of the semi-conductor wafer 2. The semi-conductor 2 and the reflective interior walls of the housing 3 essentially form a hollow space radiation assembly.

Figure 2B:
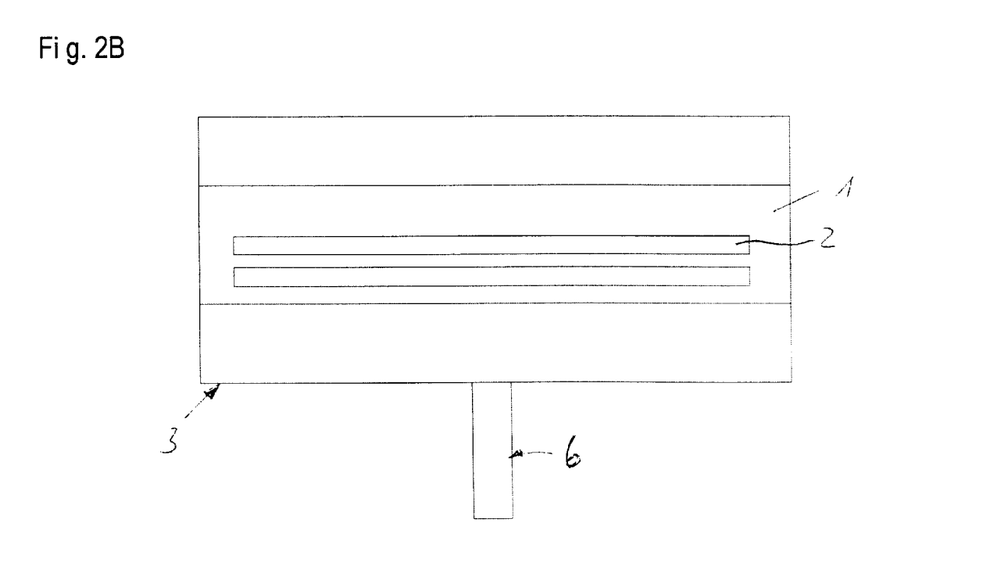

FIG. 2b shows a side elevational view of an alternative rapid heating assembly for the treatment of semi-conductor wafers, wherein the assembly includes a reaction chamber 1, comprised of quartz glass, which is enclosed within a housing 3 having reflective interior walls. A semi-conductor wafer 2 is received within the reaction chamber 1. A plate is provided extending parallel to, and at a relatively close spacing from, the semi-conductor 2 for the purpose of forming a hollow space radiation assembly in the region between the semi-conductor 2 and the plate. A pyrometer 6 is oriented in a direction through a not-illustrated opening in the plate toward a side of the semi-conductor 2 facing the plate.

An additional pyrometer 7 detects the light radiated from the lamps 5 conveyed directly via optical lines or light channels 8. In order to avoid repetition with respect to this so-called lamp pyrometer 7 and the arrangement for irradiating the lamp pyrometer 7 with the light from the lamp 5, refer to DE 197 54 385 A (not previously published) from the same applicant, which is incorporated into the instant specification.

Figure 3:
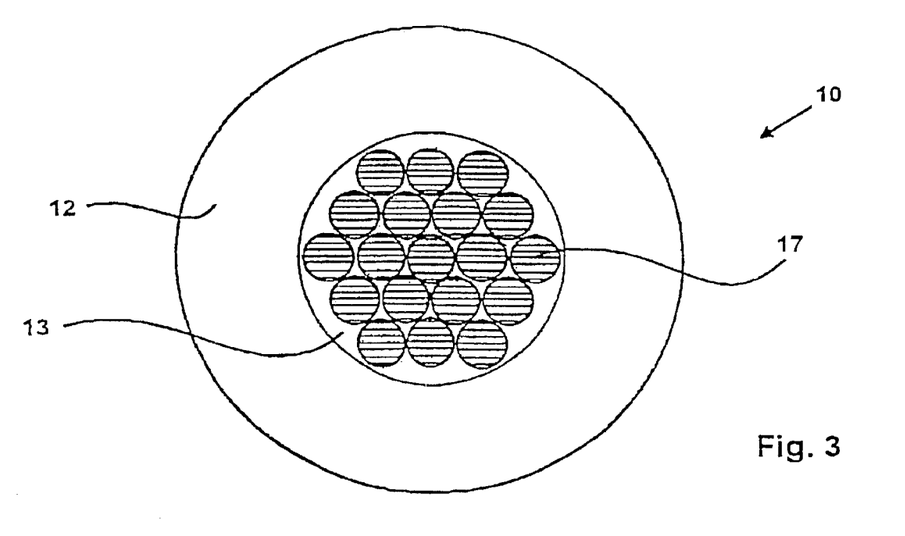
FIG. 3 is a top view of the reference substrate in accordance with the invention, whereby a covering is omitted in order to facilitate understanding.
Figures 4, 5:
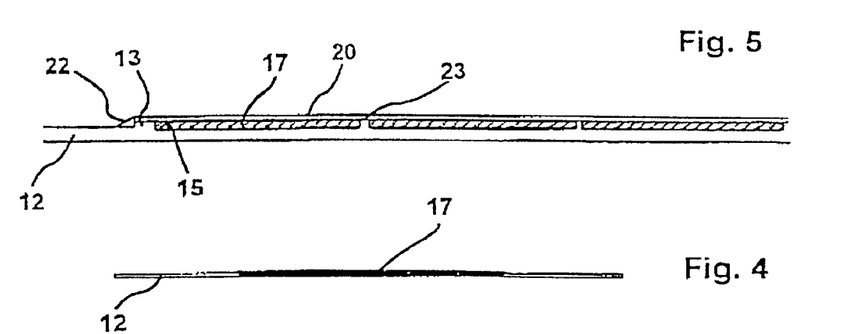
FIG. 4 is a sectional view of the reference substrate with covering in accordance with the invention.
FIG. 5 is an enlarged partial section of the reference substrate.

FIGS. 3 through 5 illustrate a reference substrate in accordance with the invention in the form of a reference wafer 10 that is used for calibrating the pyrometer 6 illustrated in FIGS. 1 and 2. The reference wafer 10 has a flat, round shape that largely corresponds to that of a semiconductor wafer 2 to be treated. The reference wafer 10 has a main or base body 12 made of ceramic material and has a circular elevation 13 in the central region. Provided in the region of the elevation 13 are circular depressions 15 for receiving a reference material in the form of metal melt inlays 17 with a known melting point. In order to achieve better surface coverage, the depressions can also be hexagonal in shape (honeycomb shape) and can be arranged over the entire cross-section of the base body 12. In order to avoid tensions between the base body 12 and the metal melt inlay, prior to first use a metal tablet is placed into the depression loose and then always solidifies with the maximum permissible diameter after the first melting. When it cools further the metal then pulls together more rapidly than the basic body. During repeated melting processes the metal then melts just before mechanical tensions can occur.

As can be seen in FIG. 3, 19 circular depressions 15 are provided and one metal melting inlay 17 with known melting point is located in each of these. However, the number of depressions 15 is not significant for the invention and can be adapted to the stability requirements of the base body 12 or to other parameters. For instance, it is possible to provide only one depression for receiving the metal melt inlay 17, whereby care must be taken that the depression is disposed in the field of view of the pyrometer 6. In accordance with additional embodiments, different metal melt inlays with different melting points are provided in the depressions rather than metal melt inlays 17 with the same known melting points.

Located over the elevation 13 and the metal melt inlays 17 is a covering 20 that is sealingly connected in its edge region 22 to the base body 12. This connection can be effected in a known way and manner by adhesive, welding, or some other known method. Formed between the covering 20 and the elevation 13 or metal melt inlay 17 is a chamber 23 that is evacuated. Rather than providing a covering, it is also conceivable to glaze the entire reference wafer or to provide a combination of these two features.

Although the reference substrate was described with respect to a special exemplary embodiment, it should be noted that the reference substrate can be embodied and shaped differently without departing from the inventive idea. For instance, the elevation 13 in the central region could be dispensed with, and the depressions 15 could be embodied directly in the base body 12. Instead of providing the metal melt inlays 17 in depressions in the base body 12, it is also possible to apply them flat on the base body, without depressions. It would also be possible to structure the surface of the base body facing away from the reference material to increase its emissivity.

For calibrating the pyrometer 6 of the aforementioned apparatus for treating semiconductors, the reference wafer 10 is introduced into the reaction chamber 1 by means of an available handling apparatus (not described in more detail), and in fact is introduced into the same position as the semiconductor wafer 2 illustrated in FIG. 1. Then the reaction chamber is closed and the reference wafer 10 is heated by means of the lamps 4, 5, whereby the pyrometer 6 measures the radiation emitted by the reference wafer 10 and the radiation of the lamp 5 reflected thereupon. During the heating process, the temperature of the metal melt inlay rises in the same manner until it reaches its melting point. From this point in time forward the temperature of the metal melt inlay does not increase further. Due to the good thermal conductivity and the consequent rapid temperature adaptation between the metal melt inlay 17 and the reference wafer 10, the temperature of the reference wafer 10 does not continue to increase, either, until the metal melt inlay 17 has completely converted from the solid phase to the liquid phase, i.e., until the latent heat has been conveyed to the metal melt inlay 17. The temperature remaining the same is measured by the pyrometer 6 as the measurement plateau and is compared to the known melting point using an apparatus (not described in greater detail).

After the metal melt inlay 17 has melted completely and does not absorb any more latent heat, the temperature of the reference wafer 10 rises again. Then the heating process is stopped and the reference wafer 10 is cooled or cools.

During the cooling process, the sequence of events occurs in reverse. The metal melt inlay 17 cools to the solidification point and its temperature then remains essentially constant until the inlay 17 has emitted all of its latent heat and is again present in the solid phase. This again results in a measurement plateau in the pyrometer measurement that can be compared to the known melting point of the inlay 17.

Determining the measurement plateau during the cooling process is advantageous because the inlay 17 in the melted state has better thermal contact to the reference substrate 10 and therefore the temperature equalization between inlay 17 and reference substrate 10 proceeds more rapidly.

Since the measured heat radiation from the reference substrate can change depending on the emissivity of the substrate, to achieve independence from emissivity during the process described in the foregoing, the radiation emitted by the lamps 4, 5 is modulated, preferably actively and in a defined manner, and the radiation emitted by the lamps 5 is measured directly with the lamp pyrometer 7. The output signals of the pyrometers 6 and 7 are forwarded to an analyzer (not shown). It calculates the radiation emitted by the reference wafer 10 in that it compares the radiation falling on the pyrometer 6, consisting of radiation emitted and reflected by the wafer 10, to the radiation detected by the pyrometer 7. This is possible because the radiation emitted by the lamps 5 is modulated in a known manner. This modulation is also contained in the radiation recorded by the pyrometer 6, so that by comparing or relating the degree of modulation and/or the depth of modulation of the radiation recorded by the pyrometers 6 and 7 it is possible to compensate the lamp radiation reflected by the reference wafer 10 in the radiation captured by the wafer pyrometer 6. Thus the relationship between the radiation emitted and reflected by the wafer 10 can be determined in order to make it possible to calculate the emissivity of the wafer 10. Based on the emissivity, the known melting point of the inlay 17 can now be compared to the radiation emitted by the reference wafer 10 in order to provide calibration relative to the absolute temperature.

Such modulation and calculation of the radiation emitted by a substrate is described, for example, in DE 197 54 386 A by the same applicant (not previously published) and in U.S. Pat. No. 5,490,728; to avoid repetition, see these documents, the contents of which are incorporated into the instant specification.

For reaching a measurement that is essentially independent of emissivity, instead of the ripple technique described in the foregoing, for example the so-called cavity principle could also be used, in which a mirrored chamber is employed in an attempt to simulate a cavity radiator.

The following provides suggested dimensioning for the reference substrate. In order to provide the most uniform possible heating of the reference substrate, it is preferably dimensioned such that the thermal mass per surface area unit is constant across the substrate. This can be achieved, e.g., by varying the thickness of the reference material so that the following equation is satisfied:

$$d_1 A p_1 A c_1 + d_2 A p_2 A c_2 + d_3 A p_3 A c_3 = d_4 A p_4 A c_4 \tag{1}$$

$d_1$, $d_2$, $d_3$, and $d_4$ are the thicknesses of the reference substrate at the melting metal inlay, the thickness of the melting metal, the thickness of the covering of the melting metal, and the thickness of the reference substrate in the regions without melting metal inlay. $p_1$, $p_2$, $p_3$, and $p_4$ and $c_1$, $c_2$, $c_3$, and $c_4$ represent the associated densities and heat capacities, respectively.

The power density P (power/surface area), e.g. of an RTP system and the heating rate R (ramp rate) can be simplified using the following equation:

$$d_4 A p_4 A c_4 A R = P \tag{2}$$

This relationship defines the power density P required at a pre-specified ramp rate R to heat the reference substrate uniformly (see equation (1)). When the reference material reaches its melting point, energy $E_L$ is required to melt it (in terms of surface area); energy $E_L$ results from the following equation:

$$E_L = d_2 A p_2 A c_s \tag{3}$$

wherein $c_s$ is the specific melting heat for the reference material. If the power density P of the RTP system remains unchanged, the plateau time $t_p$ (see FIG. 7) can be estimated using the following equation:

$$t_p = E_L / P \tag{4}$$

wherein $E_L$ and P can be taken from equations (2) and (3). Thus a plateau/time/ramp rate product can be calculated:

$$Z = t_p A R = d_2 A p_2 A c_s / d_4 A p_4 A c_4 \tag{5}$$

This product contains only the material-specific variables and the current layer thicknesses. Thus, when selecting, e.g., $d_1$, the thickness of the melting metal $d_2$ and the thickness of the reference substrate $d_4$ at the edge region can be calculated given a pre-specified product Z using equation (5) and equation (1). For purposes of simplification $d_3$ is assumed to equal 0. However, advantageously $d_3 = d_1$ can also be selected, in particular when $c_1 = c_3$. If, e.g. $d_1 = 1$ mm (or $d_1 + d_3 = 1$ mm when $c_1 = c_3$), then, for a reference substrate made of silicon at a plateau time/ramp rate product of 100 K for the melting metals germanium or aluminum, melting metal thicknesses $d_2$ of 0.071 mm or 0.2 mm result, whereby the external range of the reference substrate has thicknesses $d_4$ of 1.074 mm or 1.3 mm.

In the proposed dimensioning examples, clearly shown are the thickness relationships of reference substrate and reference material under the process condition of a constant thermal mass per surface element (equation (1)). Furthermore, the plateau time $t_p$ can also be estimated if the ramp rate R is prescribed. If, as in the described example, Z is 100K, then the plateau time $t_{p-}$ is approximately 10 seconds, if a ramp rate R of 10K/s is used.

Figure 8:
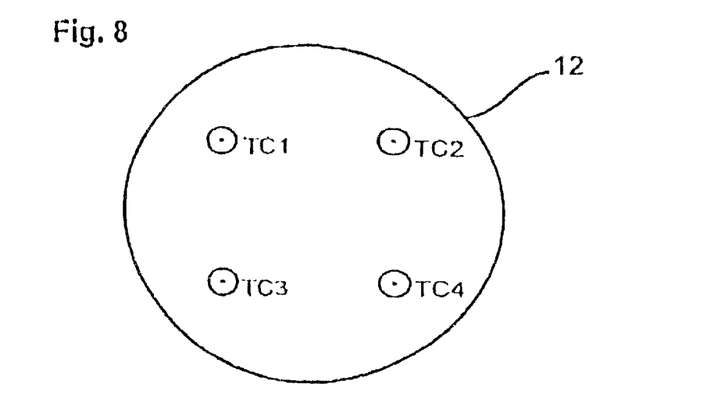
FIG. 8 is a reference substrate fitted with thermoelements.

A further example of use of the reference substrate 12 is illustrated in FIG. 8. In this connection, the reference substrate is additionally provided with at least one thermal element TC ($TC_1$, $TC_2$, $TC_3$, $TC_4$) which is secured to the reference substrate with conventional means (adhesives). This results in the possibility of measuring the thermal element TC relative to the reference substrate, and to determine possible influences of the securing means of the thermal element TC (adhesive or cement) upon a TC temperature determination.

The present invention was previously explained with the aid of one preferred specific embodiment. However, embodiments and modifications are possible for one skilled in the art without thereby departing from the inventive concept. The inventive method can also be advantageously utilized in conjunction with other apparatus or emissivity-independent measuring methods than the previously described in order with simple means to obtain a reliable, reproducible calibration of temperature measurements.

The specification incorporates by reference the disclosure of German priority documents 198 33 961.5 of Jul. 28, 1998, 199 34 299.7 of Jul. 21, 1999 and International priority document PCT/EP99/05396 of Jul. 28, 1999.

The present invention is, of course, in no way restricted to the specific disclosure of the specification and drawings, but also encompasses any modifications within the scope of the appended claims.

What we claim is:

1. A method for calibrating temperature measurements that are taken with a first radiation detector for measuring thermal radiation given off by a reference substrate, said method including the steps of:

heating said reference substrate, which carries at least one reference material having a known melting point temperature, to or over said melting point temperature;

measuring the thermal radiation of said reference substrate during said heating step, or during a cooling period that follows said heating, or during both said heating and said cooling period; and correlating a measurement plateau of the thermal radiation which occurs during said measuring step with said known melting point temperature, said measurement plateau being characterized by a period during which the thermal radiation of said reference substrate has substantially no abrupt changes wherein at least one radiation source is used for heating said reference substrate and wherein, to achieve an emissivity independent measurement, at least one of the method of detecting radiation emitted from said at one least radiation source with at least one second radiation detector, modulating the radiation emitted by said at least one radiation source with at least one characteristic parameter, and correcting the radiation detected by said at least one first radiation detector by the radiation detected by said at least one second radiation detector to compensate for radiation of said at least one radiation source reflected from said reference substrate and the method of measuring the thermal radiation emitted by said reference substrate on a side of said reference substrate that faces a cavity radiator is used.

2. A method according to claim 1, wherein modulation for characterizing the radiation emitted by said at least one radiation source is used in correcting the radiation detected by said at least one first radiation detector.

3. A method according to claim 1, wherein radiation emitted by said at least one radiation source is modulated for at least one of amplitude, frequency, and phase.

4. A method according to claim 1, wherein said at least one radiation source is formed by a plurality of lamps, and wherein radiation from at least one of said lamps is modulated.

5. A method according to claim 1, wherein a degree of modulation or depth of modulation of radiation is controlled.

6. A method according to claim 1, wherein a plurality of reference materials, each having a different melting point temperature, is provided on said reference substrate, and wherein each measurement plateau detected during the heating or cooling process is correlated to one of the known melting points.

7. A method according to claim 1, and further comprising means for supporting said reference substrate in said apparatus, which is intended for the thermal treatment of substrates, for calibrating such apparatus.

8. An apparatus for calibrating temperature measurements essentially independent of emissivity, comprising:

at least one first radiation detector for measuring thermal radiation emitted from at least one substrate;

a reference substrate to which is applied at least one reference material having a known melting point temperature, wherein said at least one reference material constitutes at least 1% of the mass of said reference substrate;

at least one radiation source for heating said reference substrate to or over the melting point temperature thereof; and a device for correlating a measured plateau of the thermal radiation, which occurs during heating of said reference substrate at said at least one first radiation detector, to said known melting point temperature;

at least one second radiation detector for measuring radiation emitted by said at least one radiation source;

a modulation device for modulating radiation emitted by said at least one radiation source with at least one characteristic parameter; and a device for correcting the radiation detected by said at least one first radiation detector with the aid of radiation detected by said at least one second radiation detector, wherein said reference substrate is provided with at least one depression for accommodating said at least one reference material and said at least one depression is provided with inclined walls.

9. An apparatus according to claim 8, wherein said at least one radiation source is formed by a plurality of lamps, and wherein radiation from at least one of said lamps is capable of being modulated.

10. An apparatus according to claim 8, wherein a degree of modulation or depth of modulation of radiation emitted by said at least one radiation source is capable of being controlled.

11. An apparatus according to claim 8, which includes a cavity radiator that is formed at least in part by said substrate.

12. An apparatus according to claim 11, wherein said cavity radiator is formed by a mirrored chamber, at least one wall portion of which is formed by said substrate.

13. An apparatus according to claim 8, wherein said cavity radiator is formed in an intermediate space between said substrate and a plate that is disposed parallel thereto.

14. An apparatus according to claim 8, wherein a covering is disposed on said reference substrate over said at least one reference material.

15. An apparatus according to claim 14, wherein a chamber is defined between said covering and said reference substrate.

16. An apparatus according to claim 15, wherein said chamber is sealed relative to its surroundings.

17. An apparatus according to claim 16, wherein said chamber is evacuated.

18. An apparatus according to claim 8, wherein said reference substrate is glazed.

19. An apparatus according to claim 8, wherein said reference substrate is provided with at least one of the same size, the same shape, and the same weight as a substrate, the temperature of which is to be measured after a calibration.

20. An apparatus according to claim 8, wherein said at least one reference material is a metal, especially a pure metal.

21. An apparatus according to claim 8, wherein different reference materials having different melting point temperatures are provided on said reference substrate.

22. An apparatus according to claim 8, wherein at least one reference material is disposed at different locations on said reference substrate.

23. An apparatus according to claim 8, wherein at least one reference material is applied to a side of said reference substrate that faces away from said at least one first radiation detector.

24. An apparatus according to claim 8, wherein a plurality of reference substrates are provided, each of which has a different optical coating and the apparatus is operable to sequentially calibrate a respective temperature for each reference substrate.

25. An apparatus according to claim 8, wherein said reference substrate is made of a ceramic material.

26. An apparatus according to claim 8, which is suitable for calibrating an apparatus for the rapid thermal treatment of substrates in an oven.

27. A reference substrate for temperature calibration comprising, in an interior of said reference substrate, at least one reference material having a known melting point temperature, wherein said at least one reference material constitutes at least 1% of the mass of said reference substrate, wherein said reference substrate is provided with at least one depression for accommodating said at least one reference material, said at least one depression being provided with inclined walls, and said at least one reference material is surrounded by substrate material having a thickness of at least three optical attenuation lengths of a selected wavelength.

28. A reference substrate according to claim 27, wherein said thickness is at least 3 μm.

29. A reference substrate according to claim 27, wherein the thermal mass per unit surface area is constant across said substrate.

* * * * *

UNITED STATES PATENT AND TRADEMARK OFFICE
CERTIFICATE OF CORRECTION

PATENT NO. : 6,561,694 B1 Page 1 of 1
DATED : May 13, 2003
INVENTOR(S) : Lerch et al.

It is certified that error appears in the above-identified patent and that said Letters Patent is hereby corrected as shown below:

<u>Title page, Item [54] and Column 1, lines 1-3,</u>
Title should read as follows:

-- METHOD AND APPARATUS FOR CALIBRATING MEASUREMENTS OF TEMPERATURES INDEPENDENT OF EMISSIVITY --

Signed and Sealed this

Thirtieth Day of September, 2003

JAMES E. ROGAN
*Director of the United States Patent and Trademark Office*